United States Patent [19]

Juferov et al.

[11] 4,216,088

[45] Aug. 5, 1980

[54] METHOD OF TREATING PHENOLIC WATERS FORMED IN THE MANUFACTURE OF PHENOL-FORMALDEHYDE RESINS

[76] Inventors: Anatoly M. Juferov, ulitsa Tukhachevskogo, 34, kv. 112; Galina I. Shakhova, bulvar Stroitelei, 1a, kv. 67; Olga M. Nesterova, Vostochny prospekt, 15b, kv. 28, Ala.L OF KEMEROVO, U.S.S.R.

[21] Appl. No.: 959,424

[22] Filed: Nov. 13, 1978

[30] Foreign Application Priority Data

Dec. 26, 1977 [SU] U.S.S.R. ................................ 2560372

[51] Int. Cl.² ............................................. C02C 5/02
[52] U.S. Cl. ..................................... 210/59; 528/147; 528/165
[58] Field of Search ....................... 528/164, 165, 147; 210/59, 60; 568/757

[56] References Cited

U.S. PATENT DOCUMENTS

| | | | |
|---|---|---|---|
| 3,655,047 | 4/1972 | Adegeest | 210/59 |
| 3,839,251 | 10/1974 | Bornstein | 528/147 |
| 3,869,387 | 3/1975 | Vargiu et al. | 210/59 |
| 3,911,046 | 10/1975 | Ackermann et al. | 528/164 |

FOREIGN PATENT DOCUMENTS 441268   4/1975   U.S.S.R. .................................... 528/165

*Primary Examiner*—Benoit Castel
*Attorney, Agent, or Firm*—Lackenbach, Lilling & Siegel

[57] ABSTRACT

The present invention relates to the field of environmental protection.

The proposed method of treatment of phenolic waters formed in the manufacture of phenol-formaldehyde resins consists in that said phenolic waters are mixed with formaldehyde and the product of phenol-formaldehyde condensation taken in the quantity of 15–25 percent parts by weight per 100 parts by weight of phenolic waters, and the mixture is heated in the presence of alkali.

7 Claims, No Drawings

METHOD OF TREATING PHENOLIC WATERS FORMED IN THE MANUFACTURE OF PHENOL-FORMALDEHYDE RESINS

This invention relates to environmental protection, and more particularly it relates to a method of treatment of phenolic waters formed in the manufacture of phenol-formaldehyde resins.

Known in the prior art is a method of treatment of phenolic waters which are formed in the manufacture of phenol-formaldehyde resins at the stage of vacuum drying, settling, and precipitation. The method consists in that admixed contaminants are absorbed from phenolic waters onto wood saw-dust, treated with formaldehyde, phenol, hydrochloric acid, and then utilized in the manufacture of molding compounds (cf. USSR Inventor's Certificate No. 420,572).

A disadvantage inherent in the known method is the lengthy duration of the process, low degree of purification and the necessity of additional treatment of the effluents.

Another method of treating phenolic waters is known, consisting in condensation of phenol and formaldehyde, which are contained in phenolic waters, in the presence of alkali, at a temperature of 150° C. for ten minutes (cf. USSR Inventor's Certificate No. 108,261).

The method has not been widely used because of the low degree of purification and because the products of condensation of phenol and formaldehyde are obtained in the form of resite unsuitable for use.

Known in the prior art is also a method of treating phenolic waters, which consists in treatment of effluents with formaldehyde, involving heating to boiling in the presence of alkali and subsequent separation of water in vacuum from the products of condensation (USSR Inventor's Certificate No. 131,694).

The disadvantage of this method is the high energy consumption and insufficient purification of the effluents.

It is an object of this invention to improve the degree of purification of phenolic waters.

This object is attained in a method of treatment of phenolic waters formed in the manufacture of phenol-formaldehyde resins, comprising introduction of formaldehyde and the product of phenol-formaldehyde condensation, taken in a quantity of 15–25 parts by weight per 100 parts by weight of phenolic waters, into said phenolic waters and heating them in the presence of alkali.

The addition of the phenol-formaldehyde condensation product and the corresponding amount of formaldehyde ensures a considerable excess of formaldehyde toward free phenol and a high degree of purification from phenol.

Moreover, the addition of said condensation product gives specific desired properties to the resin which is formed in the process of treatment of phenolic waters.

It is desirable that emulsion novolaks or A-stage resins be used as the product of phenol-formaldehyde condensation, and that the mixture be heated at a temperature of 60°–85° C.

Using said resins, and carrying out the process at a temperature of 60°–85° C. ensures the following:

the time of the process is decreased;

the conversion of the resin, which is formed during the treatment of phenolic waters, into resite is precluded;

the mixture is effectively purified from formaldehyde which remains after binding free phenol into products of its reaction with formaldehyde.

The proposed method is realized as follows.

Phenolic waters containing, for example, 2–5 percent by weight of phenol and 3–5 percent by weight of formaldehyde, are mixed with formaldehyde in the form of a 37 percent aqueous solution, the product of phenol-formaldehyde condensation, and alkali, for example, sodium hydroxide. The obtained mixture is kept for 1–3 hours at a temperature of 60°–85° C. and then cooled.

The resulting aqueous solution of the resin can be used in the manufacture of wood-fiber boards of increased hardness and water resistance. In this case, the effluents cannot be dumped into sewage.

The phenol content of the obtained aqueous solution of the resin decreases to 0.01–0.02 percent by weight and the formaldehyde content decreases to 0.03–0.07 percent by weight.

Furthermore, the obtained aqueous solution of the resin can be subjected to vacuum distillation. This gives a distillate containing less than 1 mg/liter of phenol or formaldehyde. The treated wastes can be dumped into sewage. The still residue, i.e. the resin containing not more than 0.05 percent by weight of phenol and not more than 0.1 percent by weight of formaldehyde, can be used in the manufacture of water-resistant plywood and wood-particle boards by the dry hot method, and also of wood-fiber boards of increased hardness and water resistance.

The concentration of toxic monomers in the resin which is the product of purification of phenolic waters, according to the present invention, is scores of times less than in the product of treatment of phenolic waters by the known method. The table which follows represents data on the relative toxicity of monomers contained in the products of treatment according to the present invention and to the known method (cf. USSR Inventor's Certificate No. 131,694).

Table

| Toxic agent | Monomer content, | percent by weight |
|---|---|---|
| | resin, the product of treatment of phenolic water according to the known method (USSR Inventor's Certificate No. 131,694) | resin, the product of treatment of phenolic waters according to the present invention |
| Phenol | about 1 | 0.01–0.02 |
| Formaldehyde | 0.4–0.8 | 0.03–0.07 |

Compared with the known methods, the proposed method makes it possible to substantially increase the degree of purification of phenolic waters, to obtain as the product of treatment an aqueous solution of non-toxic water-soluble phenol-formaldehyde resin of a low phenol and formaldehyde content, which is suitable for the manufacture of high-quality wood-fiber and wood-particle boards and water-resistant plywood.

The proposed method is simple, provides for high performance of the equipment and protects water basins from contamination.

For a better understanding of the invention, the following examples of its practical embodiment are given by way of illustration.

EXAMPLE 1

100 parts by weight of phenolic waters formed in the manufacture of novolaks are mixed with 3 parts by weight of sodium hydroxide, 5 parts by weight of formaldehyde (in the form of a 37 percent aqueous solution), and 15 parts by weight of the product of novolak condensation. The mixture is kept at a temperature of 85° C. for 60 minutes and then cooled.

The obtained 20.5 percent aqueous solution of a resin containing (in percent by weight);

| free phenol | 0.02 |
|---|---|
| free formaldehyde | 0.07 |
| alkali | 2.35 | is characterized by a kinematic viscosity of 50 cp at 20° C.

EXAMPLE 2

100 parts by weight of phenolic waters formed in the manufacture of resols and novolaks are mixed with 6 parts by weight of sodium hydroxide, 9 parts by weight of formaldehyde (as a 37 percent aqueous solution) and 25 parts by weight of the product of novolak condensation. The mixture is kept at a temperature of 65° C. for two hours and then cooled.

The obtained 21.2 percent aqueous solution of a resin contains the following, in percent by weight:

| free phenol | 0.0036 |
|---|---|
| free formaldehyde | 0.06 |
| alkali | 2.15 |

The product is characterized by a kinematic viscosity of 56 cp at 20° C.

EXAMPLE 3

100 parts by weight of phenolic waters formed in the manufacture of novolaks are mixed with 6 parts by weight of sodium hydroxide, 9 parts by weight of formaldehyde (as a 37 percent aqueous solution) and 22 parts by weight of the product of novolak condensation. The mixture is heated at a temperature of 80° C. for 60 minutes, and then cooled.

The obtained 22 percent aqueous solution of the resin contains the following, in percent by weight:

| free phenol | 0.01 |
|---|---|
| free formaldehyde | 0.03 |
| alkali | 2.85 |

The product is characterized by a kinematic viscosity of 58 cp at 20° C.

EXAMPLE 4

100 parts by weight of phenolic waters formed in the manufacture of resol A-stage resins are mixed with 5 parts by weight of sodium hydroxide, 6 parts by weight of formaldehyde (as a 37 percent aqueous solution) and 20 parts by weight of the product of resol condensation obtained in the presence of ammonia as a catalyst. The obtained mixture is kept at a temperature of 60° C. for three hours and then cooled.

The obtained 20.4 percent aqueous solution of the resin contains the following (in percent by weight):

| free phenol | 0.01 |
|---|---|
| free formaldehyde | 0.05 |
| alkali | 2.3 |

The product is characterized by a kinematic viscosity of 45 cp at 20° C.

EXAMPLE 5

100 parts by weight of phenolic waters formed in the manufacture of novolaks are mixed with 6 parts by weight of sodium hydroxide, 9 parts by weight of formaldehyde (as a 37 percent aqueous solution) and 25 parts by weight of a low-molecular resol, such as liquid bakelite. The mixture is kept for three hours at a temperature of 70° C. and then cooled.

The obtained 23 percent aqueous solution of the resin contains the following (in percent by weight):

| free phenol | 0.008 |
|---|---|
| free formaldehyde | 0.01 |
| alkali | 2.5 |

The product is characterized by a kinematic viscosity of 60 cp at 20° C.

EXAMPLE 6

This example is given by way of comparison of the proposed method with the prior art one (prototype).

100 parts by weight of phenolic waters formed in the manufacture of novolaks and A-stage resins are mixed with 1 part by weight of sodium hydroxide and 2.5 parts by weight of formaldehyde (as a 37 percent aqueous solution). The mixture is boiled for twenty minutes. Then water is distilled under vacuum (650 mm Hg) until the content of the condensation products in the still residue is 40 percent by weight.

The obtained distillate contains the following, in mg/liter:

| free phenol | 40 |
|---|---|
| free formaldehyde | 1000 |
| low-molecular products of phenol-formaldehyde interaction | to 2000 |

The still residue, i.e. the product of purification of phenolic waters, which is a 40 percent aqueous solution, contains the following (in percent by weight):

| free phenol | 0.9 |
|---|---|
| free formaldehyde | 0.5 |
| alkali | 8 |

The product is characterized by a kinematic viscosity of 180 cp at 20° C.

EXAMPLE 7

The 23% aqueous solution of resin obtained in Example 5 is distilled in vacuum until the resin content of the still residue is 38 percent by weight.

The distillate contains the following, in mg/liter:

| free phenol | 1 |
|---|---|
| free formaldehyde | 1 |
| alkali | 3.85 |

The still residue is characterized by a kinematic viscosity of 90 cp at 20° C.

What is claimed is:

1. A method of treatment of phenolic waters containing 2-5 weight percent phenol, and 3-5 weight percent formaldehyde, and having been formed in the manufacture of phenol-formaldehyde resins, comprising: mixing said phenolic waters with formaldehyde taken in the quantity of 5-9 parts by weight per 100 parts by weight of phenolic waters and the product of phenol-formaldehyde condensation, taken in the quantity of 15-25 parts by weight per 100 parts by weight of phenolic waters, and heating the mixture in the presence of alkali to a temperature of 60°-85° C. for a sufficient period of time to obtain a resulting solution having a substantially reduced phenol and formaldehyde content.

2. A method according to claim 1, in which emulsion novolak is used as the product of phenol-formaldehyde condensation.

3. A method according to claim 1, in which resol is used as the product of phenol-formaldehyde condensation.

4. The method of claim 1, wherein the mixture is kept for 1-3 hours at said temperature, then cooled.

5. The method of claim 1, wherein the formaldehyde to be mixed with the phenolic waters is in the form of a 37 percent aqueous solution.

6. The method of claim 1, wherein the resulting solution of treated waters has a residual phenol content varying from 0.01-0.02 weight percent and a residual formaldehyde content varying from 0.03-0.07 weight percent.

7. The method of claim 6, wherein the resulting aqueous solution is distilled to yield a distillate containing less than 1 mg/liter of phenol or formaldehyde.

* * * * *